US007210638B2

(12) United States Patent
Tujii et al.

(10) Patent No.: US 7,210,638 B2
(45) Date of Patent: May 1, 2007

(54) ELECTRIC ARC SPRAYING SYSTEM

(75) Inventors: Gen Tujii, Osaka (JP); Yousuke Nakamura, Osaka (JP); Masanobu Uchida, Osaka (JP); Kota Kodama, Toyota (JP); Nobuhide Kondo, Toyota (JP); Noritaka Miyamoto, Toyota (JP)

(73) Assignees: Daihen Corporation, Osaka (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 11/524,637

(22) Filed: Sep. 21, 2006

(65) Prior Publication Data

US 2007/0069042 A1 Mar. 29, 2007

(30) Foreign Application Priority Data

| | | | |
|---|---|---|---|
| Sep. 29, 2005 | (JP) | ............................. | 2005-284031 |
| Jul. 7, 2006 | (JP) | ............................. | 2006-187502 |
| Sep. 19, 2006 | (JP) | ............................. | 2006-252258 |

(51) Int. Cl.

| | |
|---|---|
| ***B05C 5/04*** | (2006.01) |
| ***B05B 1/24*** | (2006.01) |
| ***B05B 3/00*** | (2006.01) |
| ***B23K 9/04*** | (2006.01) |

(52) U.S. Cl. ............................ 239/84; 239/79; 239/80; 239/81; 239/83; 239/225.1; 239/263.1; 219/76.14

(58) Field of Classification Search ............ 239/79–84, 239/225.1, 263.1, 264, 290, 295, 418, 433, 239/434; 219/76.14, 76.16, 76.1; 427/449, 427/446, 455; 118/620, 641, 723

See application file for complete search history.

(56) References Cited

U.S. PATENT DOCUMENTS

| | | | | |
|---|---|---|---|---|
| 4,492,337 | A * | 1/1985 | Harrington et al. | 239/81 |
| 4,512,513 | A * | 4/1985 | Rogers | 239/8 |
| 4,550,235 | A * | 10/1985 | Fuwesi | 219/76.14 |
| 4,720,044 | A * | 1/1988 | Stemwedel, Jr. | 239/84 |
| 4,952,769 | A * | 8/1990 | Acheson | 219/76.14 |
| 5,935,458 | A * | 8/1999 | Trapani et al. | 219/121.47 |
| 6,091,042 | A | 7/2000 | Benary | |
| 2003/0029844 | A1* | 2/2003 | Esslinger | 219/76.14 |

FOREIGN PATENT DOCUMENTS

| | | |
|---|---|---|
| JP | 5-168985 | 7/1993 |
| JP | 2004-225101 | 8/2004 |

* cited by examiner

*Primary Examiner*—Kevin Shaver
*Assistant Examiner*—Darren Gorman
(74) *Attorney, Agent, or Firm*—Hamre, Schumann, Mueller & Larson, P.C.

(57) ABSTRACT

An electric arc spraying system includes a spraying gun for thermally spraying an inner surface of an object such as a cylinder block by blasting compressed gas substantially perpendicularly to the supplying direction of target wires. The spraying gun is rotated by a spraying gun rotation mechanism. The target wires are loaded in and supplied from wire supplying sources. A wire feeder rotation mechanism is provided for rotating the wire supplying sources synchronously with the spraying gun in rotation. Wire feeders are provided at the spraying gun or adjacent to the wire supplying sources for feeding the target wires. Wire support cables are configured to guide the target wires from the wire supplying sources to the spraying gun.

4 Claims, 13 Drawing Sheets

ELECTRIC ARC SPRAYING SYSTEM

BACKGROUND OF THE INVENTION

1. Field of the Invention

The present invention relates to the improvements of electric arc spraying systems for performing effective thermal spraying.

2. Description of the Related Art

In electric arc spraying, use is made of two consumable metal wires (target wires) each of which is supplied to the corresponding one of two contact chips provided in a spraying gun. In operation, an arc is generated between the target wires, and the heat from the arc melts the tips of the target wires. In accordance with the melting speed, the wires are fed to keep the arc generation. The melted metal is atomized into droplets by compressed gas, and these droplets are injected to the surface being coated.

FIG. 13 shows the configuration of a typical arc spraying system. Specifically, a system power source 1, designed to operate on the commercial power, supplies electric power to a spraying gun 2 under constant-voltage control provided by an inverter control circuit, for example. A compressor 3 generates a jet of compressed gas. The compressed gas from the compressor 3 is supplied via a solenoid valve (not illustrated) in the power source 1, and into the spraying gun 2. Meanwhile, the two target wires are unwound from two wire reels 5*a* and 5*b*, respectively, and then sent forward by the "push-side" wire feeders 4*a*, 4*b*. These target wires are guided through two guide tubes 6*a*, 6*b* to the spray gun 2, which is located away from the wire feeders 4*a*, 4*b*.

The spraying gun 2 is provided with two "pull-side" wire feeders (not illustrated) for moving the target wires, and with two contact chips (not illustrated) to which the target wires are brought for receiving electrical power. The thermal spray voltage and the target wire feeding speed are adjusted by a remote control unit 7.

Referring now to FIG. 2, a recent cylinder block (formed with four bores 8*a*–8*d*) used for an automobile engine is made of an aluminum alloy for weight reduction. Each of the bores 8*a*–8*d* accommodates a reciprocating piston and is therefore susceptible to abrasion. To protect the bores from such abrasion, an iron sleeve may be inserted into each bore. Alternatively, the inner walls of the bores may be coated with an iron-based material by thermal spraying. This method is more advantageous than the iron sleeve protection since the number of parts is reduced, thereby contributing to the weight and size reduction of the cylinder block.

Thermal spraying to a bore may be performed by inserting a spraying gun into the bore, and then causing the gun to spray in a direction perpendicular to the bore's longitudinal axis. At this time, the gun needs to be rotated about the bore's longitudinal axis so that the spraying is conducted equally to the entire inner wall of the bore that surrounds the gun. However, this thermal spray method is not achievable by the arc spraying system shown in FIG. 13, because the rotation of the spraying gun will unduly twist the guide tubes 6*a*, 6*b* since the two push-side wire feeders 4*a*, 4*b* are stationary.

In light of the above, plasma spraying or flame spraying is utilized as an alternative to the electric arc spraying because in these methods the spraying gun can be rotated easily. As known in the art, the plasma spraying is a method in which plasma jet is utilized to melt and blast powdery spray material to form a coating on an object. The flame spraying is a method in which flammable gas is burned to melt a spray material and the melted metal is blasted by compressed air onto an object to form a coating. (See JP-A-2004-225101 for example.)

However, the plasma spraying and the flame spraying suffer high running costs due to the use of expensive materials such as the working gas, the combustion gas and the melting substances.

SUMMARY OF THE INVENTION

It is an object of the present invention to provide an electric arc spraying system that is capable of performing efficient thermal spraying at low costs and contributing to improvement of the productivity.

According to the present invention, there is provided an electric arc spraying system comprising: a spraying gun for thermally spraying an inner surface of an object by blasting compressed gas substantially perpendicularly to a supplying direction of target wires; a spraying gun rotation mechanism for rotating the spraying gun; wire supplying sources loaded with the target wires; a wire feeder rotation mechanism for rotating the wire supplying sources synchronously with the spraying gun in rotation; wire feeders provided on a side of the spraying gun or the wire supplying sources for feeding the target wires; and wire support cables for guiding the target wires from the wire supplying sources to the spraying gun.

Preferably, the system of the present invention may further comprise a cable support mechanism for supporting two wire support cables and causing the two wire support cables to cross with each other. In this case, the exiting direction of the target wires from the wire supplying sources may be opposite to the entering direction of the target wires into the spraying gun. The two wire support cables may be arranged to extend in parallel to each other between the wire supplying sources and the cable support mechanism. The two wire support cables may be inserted into the cable support mechanism in a mutually crossing manner. The two wire support cables may be arranged to extend in parallel to each other between the cable support mechanism and the spraying gun.

Preferably, the cable support mechanism may include a support main body and a rotation member which is rotatably supported by the support main body. The rotation member may be formed with two cable insertion holes crossing with each other.

Preferably, the cable support mechanism may comprise a first cable support and a second cable support. The first cable support may include a first support main body and a first rotation member which is rotatably supported by the first support main body and formed with two cable insertion holes parallel to each other. The second cable support may include a second support main body and a second rotation member which is rotatably supported by the second support main body and formed with two cable insertion holes parallel to each other. The two wire support cables may be crossed with each other between the first cable support and the second cable support.

With the above arrangements, the rotation of the wire supplying sources can be synchronized with the rotation of the spraying gun, from the beginning to the end of the thermal coating procedure. Thus, it is possible to reduce the occurrence of twisting in the wire support cables. Further, according to the present invention, the rotation radius of the spraying gun can be reduced to e.g. 70 mm. Therefore, the spraying gun in use does not interfere with jigs or the object being coated. This contributes to the realization of an arrangement as shown in FIG. 1, in which use is made of two arc spraying systems. The two spraying guns may be disposed at an interval corresponding to the pitch of bores so that two inner surfaces of the bores can be simultaneously coated by thermal spraying. In this way, the efficiency and productivity in thermal spraying are significantly improved.

According to the present invention, the wire supplying source may be a pail pack in which a target wire is stored. This increases the amount of loadable target wire up to three times over the possible loading amount by a conventional wire reel. Accordingly, it is possible to conduct a long-time continuous operation without changing the wire reels. That leads to a remarkable increase in productivity.

Other features and advantages of the present invention will become apparent from the detailed description given below with reference to the accompanying drawings.

DETAILED DESCRIPTION OF THE PREFERRED EMBODIMENTS

Preferred embodiments of the invention will be described below with reference to the accompanying drawings.

Figure 1:
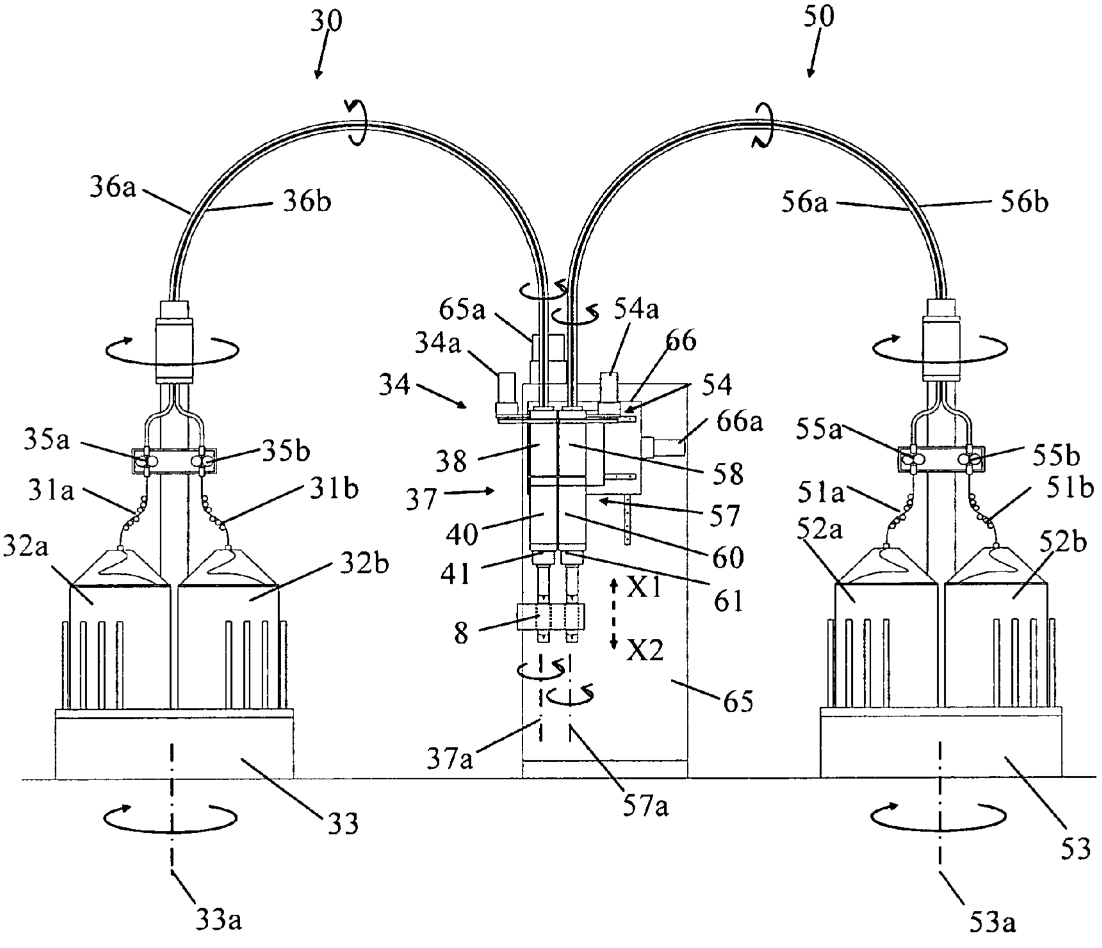
FIG. 1 shows an electric arc spraying system according to a first embodiment of the present invention.
Figure 2:
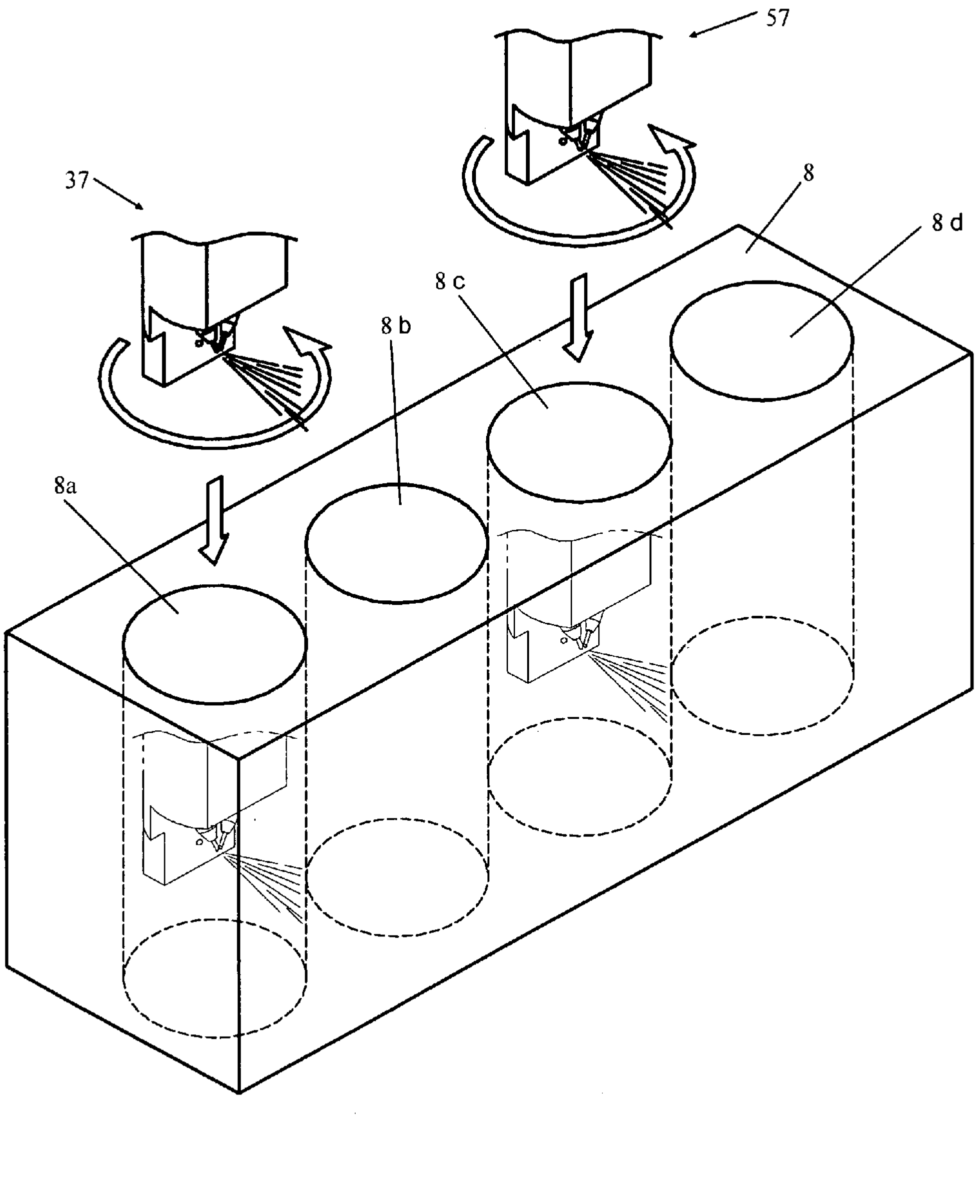
FIG. 2 illustrates how thermal spraying is performed to the inner surface of a bore formed in a cylinder block for a 4-cylinder engine.
Figure 3:
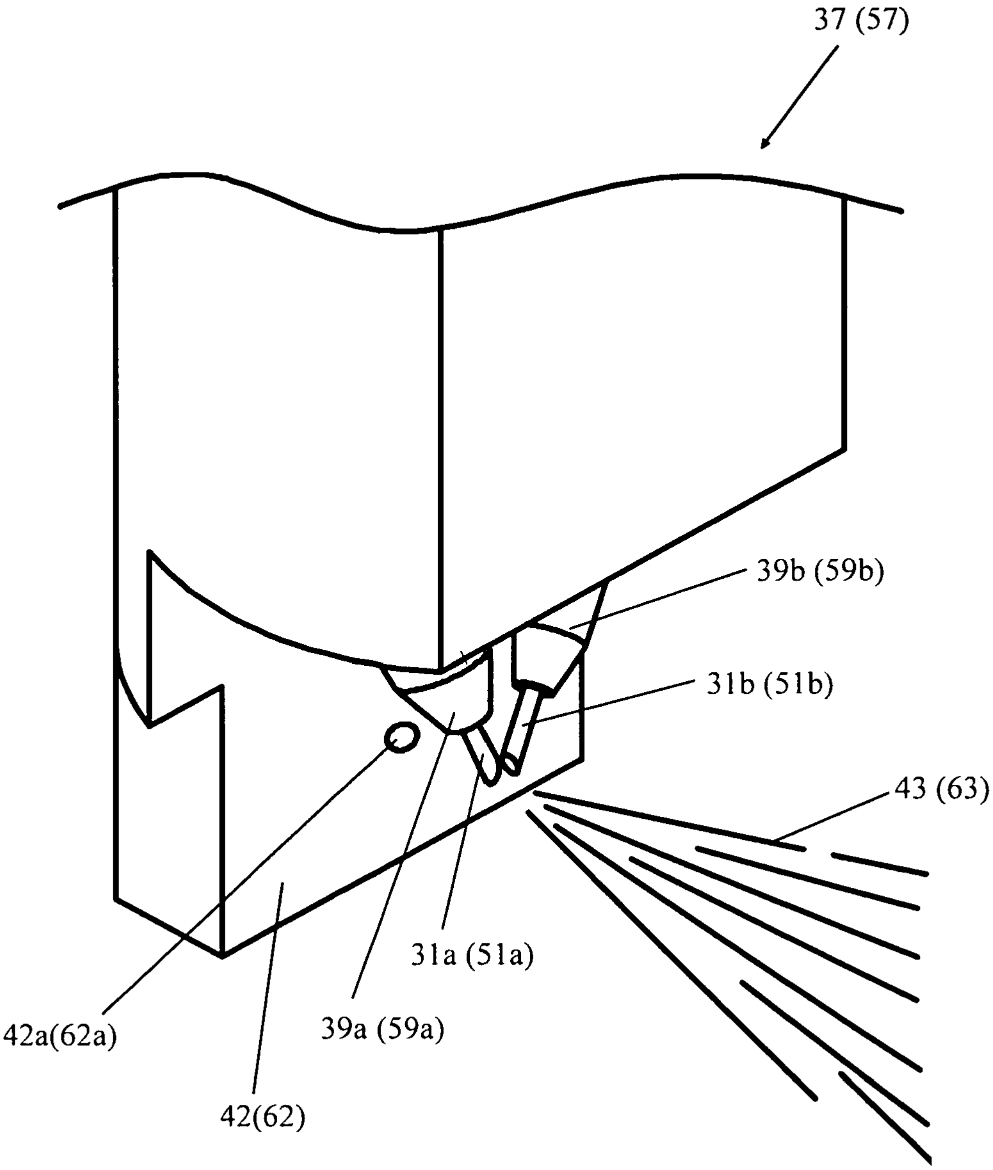
FIG. 3 is an enlarged view showing a tip portion of a spraying gun.

Reference is first made to FIGS. 1–3 which illustrate an electric arc spraying system according to a first embodiment of the present invention. Specifically, FIG. 1 illustrates two arc spraying units used for performing thermal spraying, FIG. 2 four bores of a cylinder block subject to the thermal spraying, and FIG. 3 the tip or lower end of a spraying gun of the arc spraying unit. Of these figures, FIGS. 2 and 3 will also be referred to for describing the second through the fourth embodiments.

As shown in FIG. 1, the first electric arc spraying unit 30 is provided with two pail packs 32*a*, 32*b* that are arranged side-by-side on a wire feeder rotation mechanism 33. Each pail pack contains an appropriate length of a target wire 31*a* or 31*b* which is spirally stacked in the pail pack. The pail packs 32*a*, 32*b* are rotated by the rotation mechanism 33. This rotation is synchronized with the rotation of a spraying gun 37 to be described later. The rotation axis 33*a* of the mechanism 33 is parallel to the spraying gun's rotation axis 37*a*.

Two push-side wire feeders 35*a*, 35*b* send forward the target wires 31*a*, 31*b* pulled out of the pail packs 32*a*, 32*b*. The target wires 31*a*, 31*b* are guided by two flexible wire support cables 36*a*, 36*b* to be brought to the spraying gun 37. The wire support cables 36*a*, 36*b* curve gently, with their apex supported by e.g. a bearing (not shown).

The spraying gun 37 is provided with a pull-side wire feeder 38, which forwards the two target wires 31*a*, 31*b* (which have reached the spraying gun 37) to contact chips 39*a*, 39*b*, respectively (see FIG. 3) provided at a front or lower portion of the spraying gun 37. A power supply slip ring 40 receives electric power from the power source 1, and this power is supplied to the two contact chips 39*a*, 39*b*. A rotary coupling 41 for supplying compressed gas receives compressed gas from a compressor 3 and supplies the compressed gas to a nozzle 42 (See FIG. 3). This nozzle is formed with a compressed gas blasting hole 42*a*, from which the compressed gas is blasted substantially perpendicularly to the feeding direction of the target wires 31*a*, 31*b* (the blasted gas is indicated by reference numeral 43 in FIG. 3). The spraying gun 37 is mounted on a spraying gun rotation mechanism 34, and is rotated about the rotation axis 37*a* by a motor 34*a*.

The second arc spraying unit 50 functions in the same manner as the first arc spraying unit 30 described above. To this end, the second unit 50 is provided with components such as target wires 51*a*–51*b*, pail packs 52*a*–52*b*, a wire feeder rotation mechanism 53 (rotation axis 53*a*), a spraying gun 57 (rotation axis 57*a*), push-side wire feeders 55*a*–55*b*, wire support cables 56*a*–56*b*, a pull-side wire feeder 58, contact chips 59*a*–59*b*, a power supply slip ring 60, a compressed gas supply rotary coupling 61, a nozzle 62 (with a compressed gas blasting hole 62*a*, from which compressed gas 63 is blasted), a spraying gun rotation mechanism 54 and a motor 54*a* of the rotation mechanism 54. The function of these components is the same as that of the counterparts of the first arc spraying unit 30.

In the first and the second arc spraying units 30, 50, the spraying gun rotation mechanisms 34, 54 are associated with a spraying gun lift mechanism 65 (which raises and lowers the rotation mechanisms 34, 54) and with a spraying gun rotation axis positioning mechanism 66 (which shifts the spraying guns' rotation axes sideways).

The spraying system according to the first embodiment is operated in the following manner. As shown in FIGS. 1 and 2, the lift mechanism 65 and the rotation axis positioning mechanism 66 bring the spraying gun 37 of the first unit 30 and the spraying gun 57 of the second unit 50 to a position above the cylinder block 8 so that the rotation axes 37*a*, 57*a* of the respective spraying guns align with the center lines of a first bore 8*a* and a third bore 8*c*. Then, the lift mechanism 65 lowers the spray guns 37, 57 in an arrow-indicated direction X2 into the bores 8*a*, 8*c*, respectively. In the first arc spraying unit 30, the two push-side wire feeders 35*a*, 35*b* send two target wires 31*a*, 31*b* from the pail packs 32*a*, 32*b*. The wires 31*a*, 31*b* are guided by the wire support cables 36*a*, 36*b* until they reach the spraying gun 37.

Figure 13:
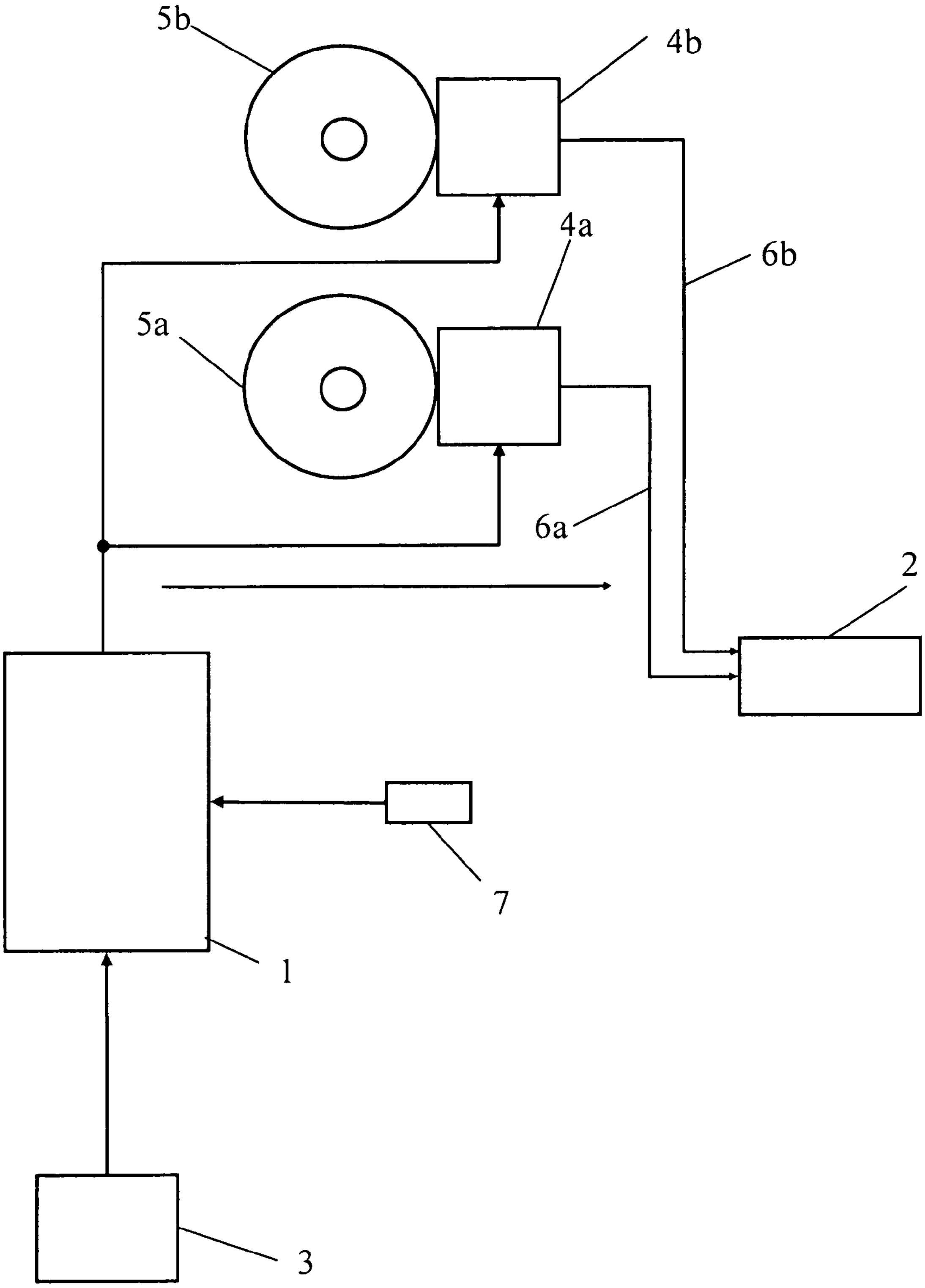
FIG.13 Prior Art
FIG. 13 shows the configuration of a typical arc spraying system.

Upon input of a start signal to the power source 1 (see FIG. 13), the compressor 3 begins to supply compressed gas, through a solenoid valve (not illustrated) in the power source 1 and via the rotary coupling 41 of the spraying gun 37, to the nozzle 42. Meanwhile, the pull-side wire feeder 38 in the spraying gun forwards the target wires 31*a*, 31*b* (which come from the pail packs 32*a*, 32*b*) to the contact chips 39*a*, 39*b* (see FIG. 3).

Electric power supplied from the power source 1 is transmitted, via the slip ring 40 and the contact chips 39*a*, 39*b*, to target wires 31*a*, 31*b*. Then, the target wires 31*a*, 31*b* are short-circuited, and an arc is generated at an arc generation position between the tips of the target wires 31*a*, 31*b*.

The tips of the two target wires 31*a*, 31*b* are continuously melted by the arc heat. By selecting an appropriate thermal spray voltage and the target wire feeding speed, it is possible to keep the arc. Meanwhile, the compressed gas is blasted substantially perpendicularly to the feeding direction of the target wires 31*a*, 31*b*, from the compressed gas blasting hole 42*a* of the nozzle 42. The metal, melted by the arc heat, is atomized and blasted by the jet of the compressed gas, forming a thermal spray blast 43 to be sprayed onto the inner surface of the first bore 8*a*. Simultaneously, the spraying gun 37 is rotated by the spraying gun rotation mechanism 34, and the two pail packs 32*a*, 32*b* are rotated by the rotation mechanism 33 in synchronization with the rotation of the spraying gun 37.

The operation of the second arc spraying unit 50 is the same as that of the first arc spraying unit 30 described above. Specifically, the compressed gas from the compressor 3 is supplied to the nozzle 62 via the rotary coupling 61 of the spraying gun 57. Also, two target wires 51*a*, 51*b* from the pail packs 52*a*, 52*b* are moved by the push-side wire feeders 55*a*, 55*b*. The wires are then sent by the pull-side wire feeder 58 to the contact chips 59*a*, 59*b* (See FIG. 3) which are provided at a lower portion of the spraying gun 57. Electric power is supplied from the power source 1, via the slip ring 60, to the contact chips 59*a*, 59*b*. Then, the target wires 51*a*, 51*b* are short-circuited at an arc generation position, thereby generating an arc between the tips of the two wires.

Meanwhile, the compressed gas is blasted substantially perpendicularly to the feeding direction of the target wires 51*a*, 51*b*, from the compressed gas blasting hole 62*a* of the nozzle 62. The metal, melted by the arc heat, is atomized and blasted by the jet of compressed gas, forming a thermal spray blast 63 to be sprayed onto the inner surface of the third bore 8*c*. Simultaneously, the spraying gun 57 is rotated by the spraying gun rotation mechanism 54, and the two pail packs 52*a*, 52*b* are rotated by the rotation mechanism 53 in synchronization with the rotation of the spraying gun 57.

Upon rotation of the two spraying guns 37, 57, the lift mechanism 65 lowers the spraying guns 37, 57 in the arrow-indicated direction X2. In this way, the inner surfaces of the first bore and the third bore are thermally coated. Thereafter, when a stop signal is inputted to the power source 1, the blasting of the compressed gas is stopped. At the same time, the feeding of the target wires 31*a*–31*b* and 51*a*–51*b* is stopped, and the supply of the thermal spray current is stopped. Thus, the thermal spraying is terminated.

Then, the lift mechanism 65 lifts the two spraying guns 37, 57 out of the cylinder block 8 in an arrow-indicated direction X1. Next, the rotation axis positioning mechanism 66 moves the spraying guns 37, 57 horizontally so that the spraying guns' rotation axis 37*a* and the spraying guns' rotation axis 57*a* align with the center lines of the second bore 8*b* and the fourth bore 8*d*, respectively. Thereafter, the same operation as described above is repeated to thermally coat the inner surface of the second bore 8*b* and the inner surface of the fourth bore 8*d*.

In the first embodiment described above, use is made of two kinds of wire feeders, i.e., the push-side and the pull-side wire feeders, for ensuring stable supply of the target wires. According to the present invention, however, either the push-side feeders or the pull-side feeders may suffice. Further, the synchronized rotation between the rotation mechanism and the spraying gun rotation mechanism may be achieved by providing each of these rotation mechanisms with a servomotor configured to be controlled by a servo-controller.

With the above-described arrangement, a perfect synchronization is possible between the rotation of the wire supplying sources (the pail packs in the illustrated embodiment) and the rotation of the spraying guns through the entire thermal spraying procedure, so that the wire support cables are not twisted. Further, it is possible to make compact the spraying guns, whose rotation radius is reduced to e.g. 70 mm, whereby the spraying guns do not interfere with jigs or the object being coated. Thus, the arrangement as shown in FIG. 1 is possible, in which two arc spraying units are disposed at an interval corresponding to the bores for performing simultaneous thermal spraying to the internal surfaces of the bores. Advantageously, this contributes to enabling efficient and low-cost thermal spraying and improving the productivity significantly.

Further, in the arc spraying system according to the first embodiment of the present invention, target wires are stored in the pail packs. This makes it possible to increase the amount of loadable target wires up to three times over the amount possible in the conventional spraying systems. Therefore, a long-time continuous operation is possible, which serves to remarkably improve the productivity.

Figure 4:
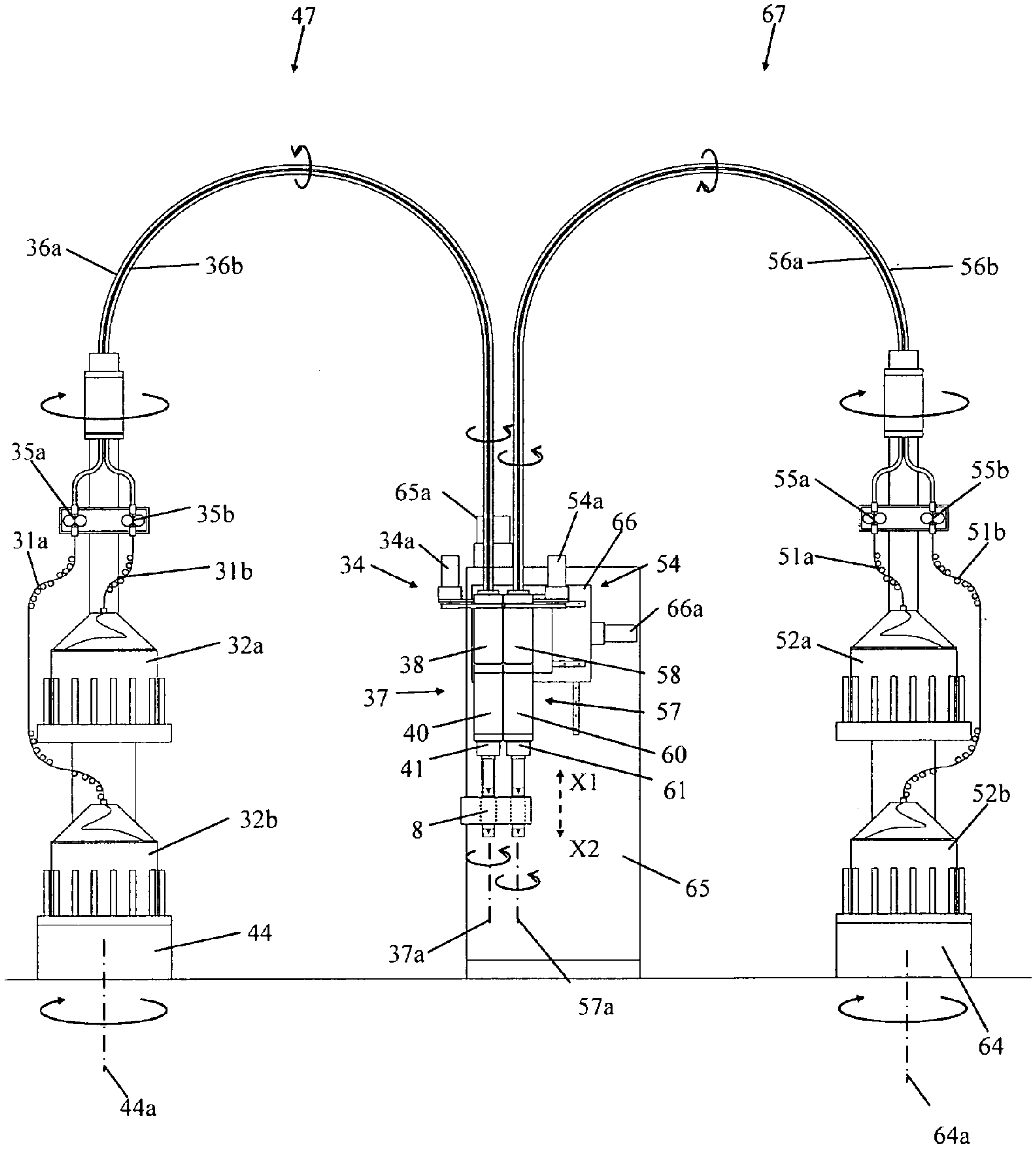
FIG. 4 shows an electric arc spraying system according to a second embodiment of the present invention.

FIG. 4 shows an electric arc spraying system according to the second embodiment of the present invention. Like FIG. 1, FIG. 4 illustrates how the inner surfaces of bores formed in a cylinder block of a 4-cylinder engine is thermally coated with the use of two arc spraying units. In the second embodiment, the first arc spraying unit 47 is provided with two pail packs 32*a*, 32*b* that are disposed in tiers, i.e. one above the other, with the rotation axes of the two pail packs 32*a*, 32*b* aligned with the rotation axis 44*a* of a wire feeder rotation mechanism 44.

Likewise, in the second arc spraying unit 67, two pail packs 52*a*, 52*b* are disposed in tiers, with their rotation axes aligned with the rotation axis 64*a* of a wire feeder rotation mechanism 64. The other components, having the same function as the counterparts of the first embodiment, are indicated by the same signs used as in FIG. 1, and no separate description thereof is given below. Further, the arc spraying system of the second embodiment operates in essentially the same manner as the system of the first embodiment, and no separate description is given.

In addition to the advantages of the first embodiment, the second embodiment enjoys the following advantages. As noted above, the rotation axes of the pail packs 52*a*–52*b* of the second embodiment is aligned with the rotation axis of the rotation mechanism 64. As a result, the centrifugal force occurring upon rotation of the pail packs 52*a*–52*b* does not collapse but preserve the neat piles of the accommodated target wires. Therefore, the supply of the target wires is performed properly. Further, it is possible to reduce both the size of the components of the driving source for the rotation mechanism 64 and the size the relevant mechanical structure, since the pail packs and the rotation mechanism have a smaller moment of inertia and therefore requires smaller driving force.

Figure 5:
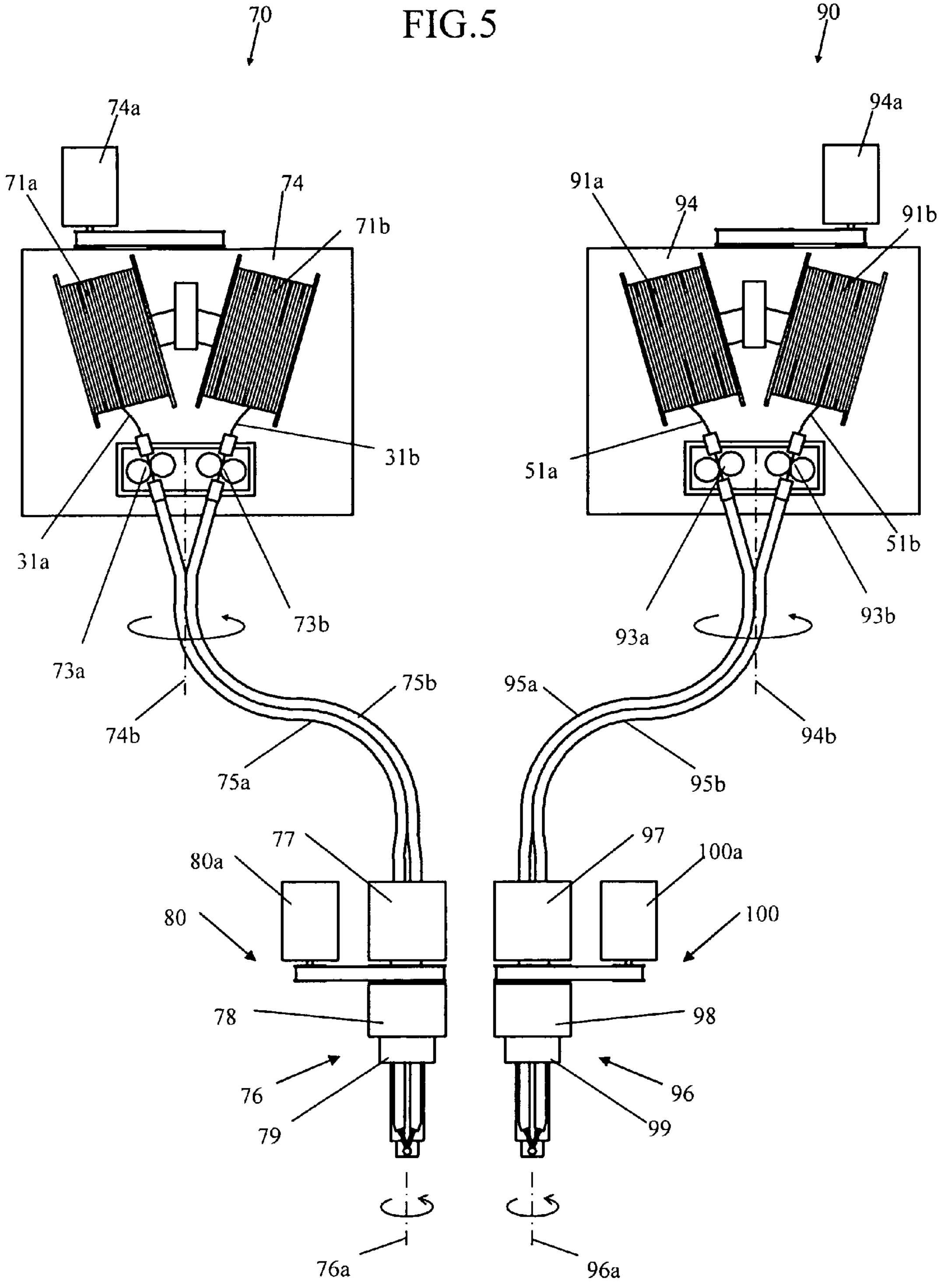
FIG. 5 shows an electric arc spraying system according to a third embodiment of the present invention.

FIG. 5 shows an electric arc spraying system according to the third embodiment of the present invention. Like FIG. 1, FIG. 5 illustrates an instance in which two arc spraying units are used for thermal spraying. It should be noted that in the figure, elements such as a cylinder block, a spraying gun lift mechanism and a spraying gun rotation axis positioning mechanism, which are actually used, are not shown since these are the same as those shown in FIG. 1.

As shown in FIG. 5, two wire reels 71*a*, 71*b* hold two coils of target wires 31*a*, 31*b* respectively. The push-side wire feeders 73*a*, 73*b* send the target wires 31*a*, 31*b*. These two wire reels 71*a*, 71*b* and two push-side wire feeders 73*a*, 73*b* are mounted on a wire feeder rotation mechanism 74 and rotated by a motor 74*a* in synchronization with a spraying gun rotation mechanism 80 to be described later. The rotation mechanism has its rotation axis 74*b* extending in parallel to a spraying gun's rotation axis 76*a*. Wire support cables 75*a*, 75*b* are flexible, and guide the target wires 31*a*, 31*b* which come out of the two push-side wire feeders 73*a*, 73*b* until they reach a spraying gun 76.

The spraying gun 76 is provided with a pull-side wire feeder 77, which further sends the two target wires 31*a*, 31*b* from the wire reels 71*a*, 71*b*. The target wires 31*a*, 31*b* are thus sent respectively to two contact chips 39*a*, 39*b* (See FIG. 3) provided at a lower portion of the spraying gun 76. A power supply slip ring 78 receives electric power from the power source 1, and supplies the power to the two contact chips 39*a*, 39*b*.

The compressed gas supply rotary coupling 79 receives compressed gas from the compressor 3. The compressed gas is then supplied to the nozzle 42 (See FIG. 3) at the tip of the spraying gun 76. The nozzle 42 has a compressed gas blasting hole 42*a*, from which the compressed gas is blasted substantially perpendicularly to the feeding direction of the target wires 31*a*, 31*b*. The spraying gun 76 is mounted on a spraying gun rotation mechanism 80, and is rotated by a motor 80*a*.

The second arc spraying unit 90 has essentially the same function as of the first arc spraying unit 70, and is provided with wire reels 91*a*–91*b*, target wires 51*a*–51*b*, push-side wire feeders 93*a*–93*b*, a wire feeder rotation mechanism 94, a motor 94*a* of the rotation mechanism (its rotation axis 94*b*), a spraying gun 96 (its rotation axis 96*a*), wire support cables 95*a*–95*b*, a pull-side wire feeder 97, contact chips 59*a*–59*b*, a power supply slip ring 98, a compressed gas supply rotary coupling 99, a nozzle 62 (with a compressed gas blasting hole 62*a*), a spraying gun rotation mechanism 100 and a motor 100*a*. These components function in the same manner as the counterparts of the first arc spraying unit 70.

FIG. 5 does not illustrate elements such as a cylinder block, a spraying gun lift mechanism or a spraying gun rotation axis positioning mechanism, which are actually provided. The arc spraying system of the third embodiment operates in the same way as that of the first embodiment in FIG. 1. The difference in arrangement between the third and the first embodiments is that the third embodiment utilizes wire reels 71*a*–71*b* in place of the pail packs of the first embodiment.

As a result of the above-described arrangement, it is possible to reduce the size of the spraying guns so that the guns do not interfere with jigs or the object being coated. Thus, in the third embodiment again, the two arc spraying units 70, 90 can be disposed at an interval corresponding to two bores whose internal walls are subjected to simultaneous thermal spraying. Advantageously, this contributes to enabling efficient and low-cost thermal spraying and also to improving the productivity significantly.

It should be noted here that in the arc spraying unit 70 according to the third embodiment, the distance between the wire reels 71*a*, 71*b* and the spraying gun 76 can be short enough to dispose of the push-side wire feeders 73*a*–73*b*. On the other hand, when the pull-side wire feeder 77 is not provided to attain further size reduction of the spraying gun 76, the push-side wire feeders 73*a*, 73*b* need to be provided.

The spraying gun rotation mechanism 80 may be configured to vertically move independently of the rotation mechanism 74. For more stable supply of the target wires 31*a*–31*b*, however, it may be preferable to cause the spraying gun rotation mechanism 80 and the rotation mechanism 74 to simultaneously move upward or downward.

Figure 6:
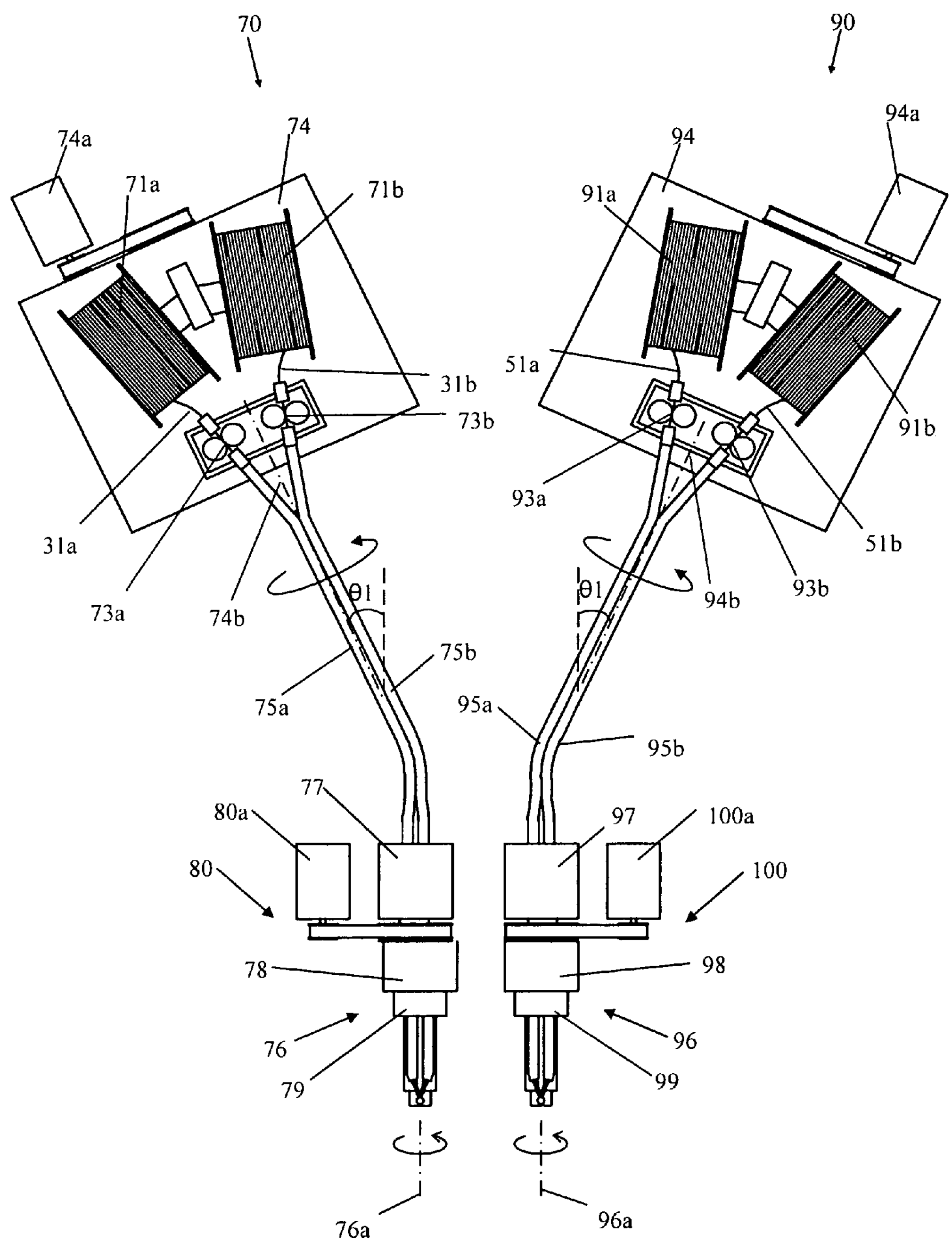
FIG. 6 shows an electric arc spraying system according to a fourth embodiment of the present invention.

FIG. 6 shows an electric arc spraying system according to a fourth embodiment of the present invention. Like FIG. 5, FIG. 6 illustrates an instance in which two arc spraying units are used for performing thermal spraying. It should be noted that the figure does not show a cylinder block, a spraying gun lift mechanism and a spraying gun rotation axis positioning mechanism, which are actually used, since these are the same as those shown in FIG. 1.

As shown in FIG. 6, the rotation mechanism's axes 74*b*, 94*b* are not parallel to the rotation axes 76*a*, 96*a* of the spraying gun rotation mechanism. Instead, the axes 74*b*, 94*b* are slanted to the rotation axes 76*a*, 96*a* at an angle $\theta 1$, which ensures more stable supply of the target wires from the reel to the gun. The other arrangements and functions of the fourth embodiment are the same as those of the third embodiment shown in FIG. 5, and the same reference characters are used for indicating the same or similar elements.

In the first through fourth embodiments described above, the bores' inner surfaces are thermally coated by using two arc spraying units. According to the present invention, three or more electric arc spraying units may be used simultaneously, so that the thermal coating can be more efficiently.

In the first embodiment illustrated in FIG. 1 and the second embodiment illustrated in FIG. 4, the wire support cables 36*a*–36*b* have their front ends connected to the pull-side wire feeder 38, and their base ends connected to the push-side wire feeders 35*a*–35*b*. In this arrangement, the direction in which the target wires are sent out from the push-side wire feeders 35*a*, 35*b* is opposite to the direction in which the target wires go into the pull-side wire feeder 38. With such a configuration, an inconvenience may occur when two parallel wire support cables are rotated in the manner to be described below.

Figure 7:
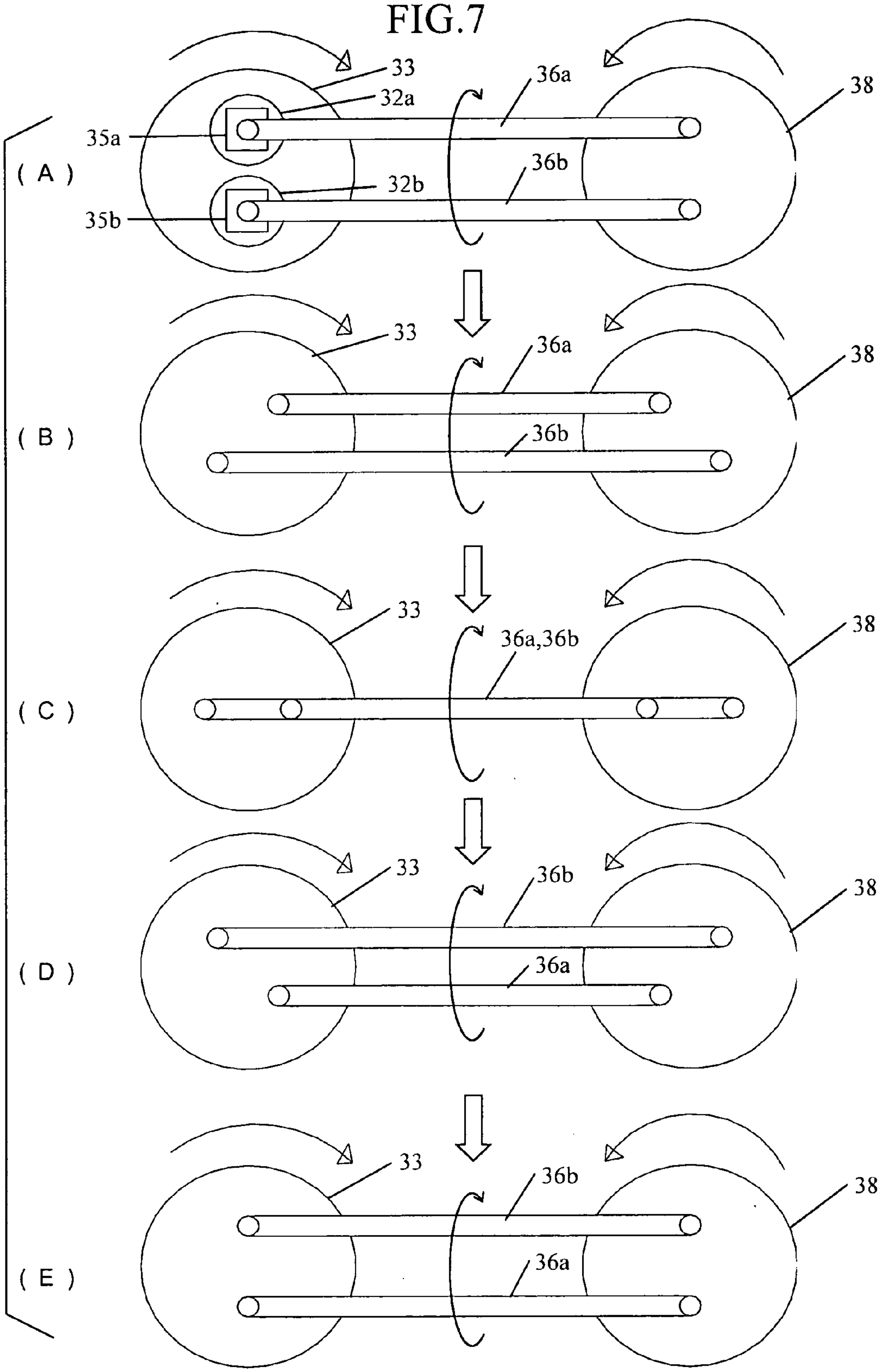
FIG. 7 illustrates the rotation of two parallel wire support cables.

In the situation shown in FIG. 7, the pail packs 32*a*, 32*b* are placed on the rotation mechanism 33, and the target wires 31*a*, 31*b* from the pail packs are sent by the push-side wire feeders 35*a*, 35*b* respectively. The target wires 31*a*, 31*b* are guided by the flexible wire support cables 36*a*, 36*b* until they reach the pull-side wire feeder 38.

As shown in FIG. 7(A), initially, two wire support cables 36*a*, 36*b* are arranged in parallel to each other. Then, the pull-side wire feeder 38 turns in a predetermined direction (anticlockwise in the figure), and in synchronization with this rotation, the rotation mechanism 33 turns in the opposite direction (clockwise). Correspondingly, the wire support cables 36*a*, 36*b* are caused to rotate in the arrow-indicated direction. Since the cables are flexible and their ends are fixed, the wire support cable 36*a* is compressed, whereas the other wire support cable 36*b* is stretched, as shown in FIG. 7(B) through FIG. 7(D). Then, as the cables 36*a*, 36*b* take the parallel position shown in FIG. 7(E), their lengths return to the initial one. Thereafter (not shown in the figure), the wire support cables 36*a* is stretched and the wire support cables 36*b* is compressed.

In the above-described process, the target wires 31*a*–31*b* in the cables are not subjected to the compressing nor stretching force because they are not fixed at their ends. Thus, the frictional resistance between the wires 31a–31b and the cables 36a–36b varies as the cables 36a, 36b rotate. As a result, the target wires 31a, 31b may undulate, which hinders a proper wire feeding operation. Specifically, the length of the target wires 31a, 31b protruding from the contact chips 39a, 39b (see FIG. 3) may fail to remain constant (that is, becomes too long or too short). This can lead to drawbacks such as occurrence of short-circuiting between the target wires, occurrence of sputters or unexpected variation of the arc-generating position with respect to the compressed gas blasting hole 42a. Consequently, it may become difficult to make a uniform thermal coating layer.

Figure 8:
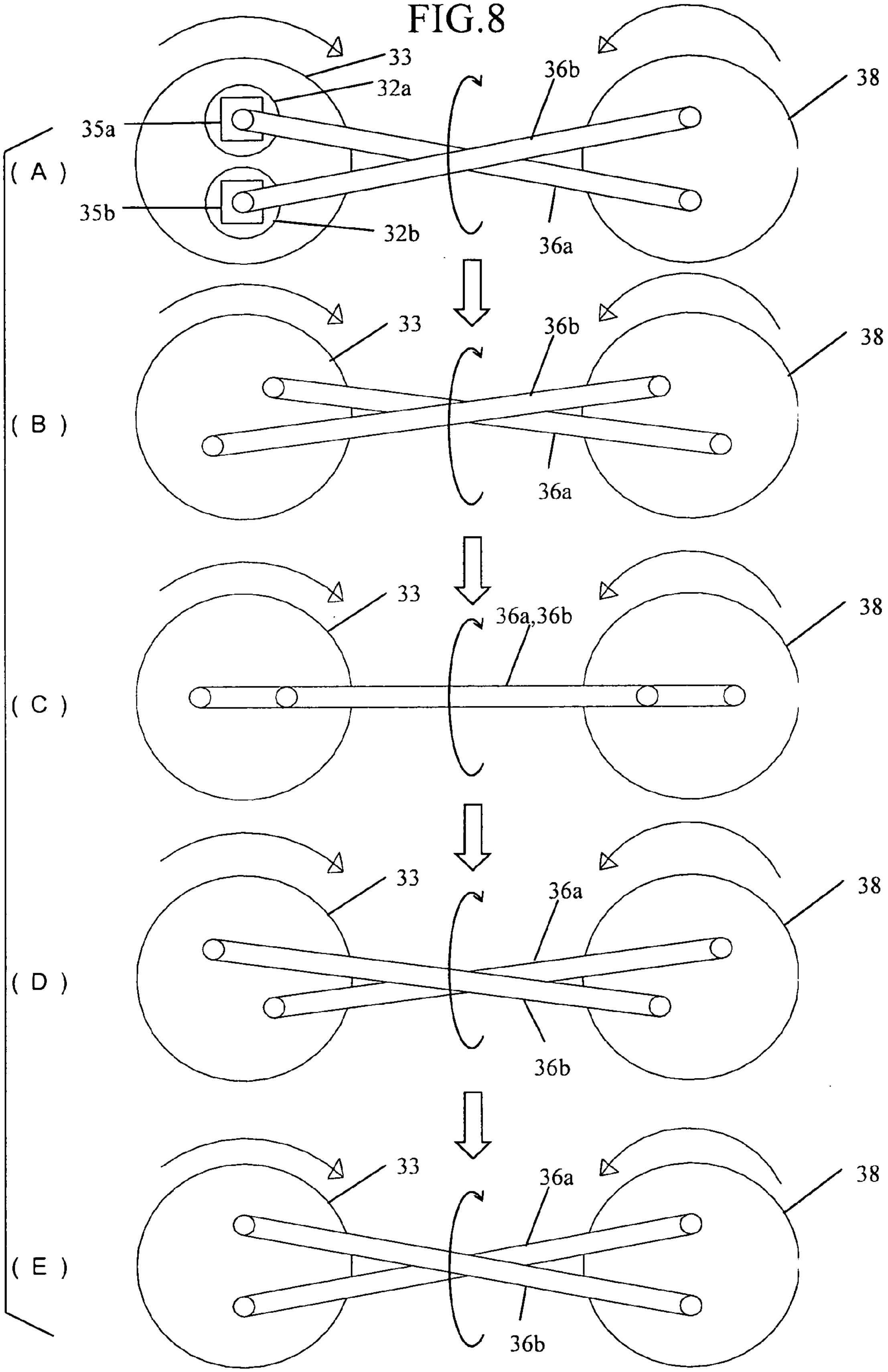
FIG. 8 illustrates the rotation of two crossing wire support cables.

In order to cope with the above, the two wire support cables 36a, 36b may be arranged to cross with each other, as shown in FIG. 8. This figure illustrates the behavior of the crossed wire support cables 36a, 36b as they are rotated. Specifically, as shown in FIG. 8(A), two wire support cables 36a, 36b take an initial position in which they are crossed with each other. Then, as show in FIG. 8(B) through FIG. 8(E), the pull-side wire feeder 38 turns in a predetermined direction (anticlockwise in the figure), while the rotation mechanism 33 turns in the opposite direction (clockwise) synchronously with the wire feeder 38. In this process, the wire support cables 36a, 36b also turn in the arrow-indicated direction. With such a cable-crossing arrangement, as seen from the figure, it is possible to prevent the wire support cables 36a–36b from being compressed or stretched as they are rotated (in other words, their original lengths are unchanged). Therefore, the frictional resistance between target wires 31a–31b and the wire support cables 36a–36b does not vary, so that the feeding of the target wire 31a, 31b is performed stably, and a uniform thermal coating is formed.

Figure 9:
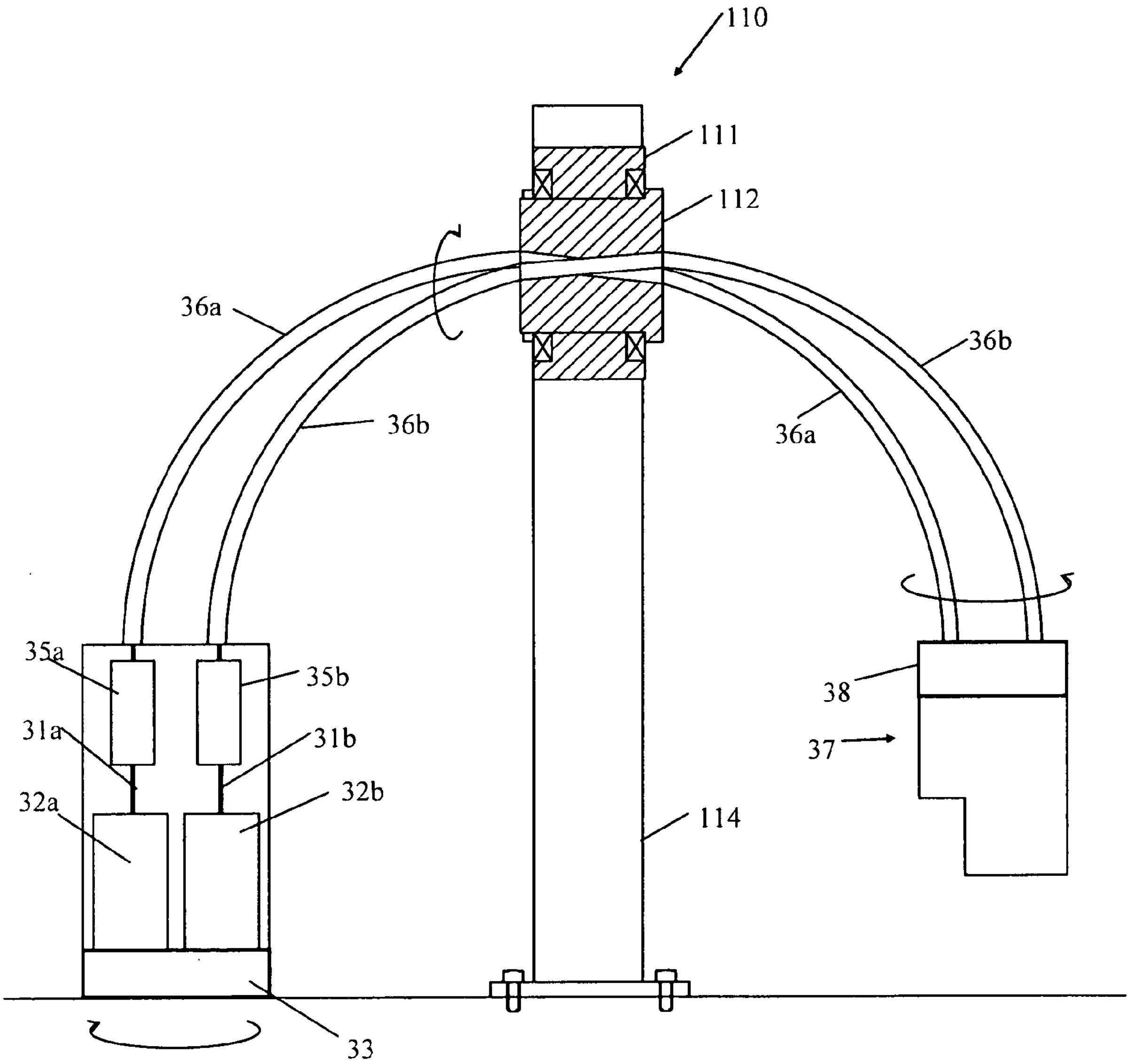
FIG. 9 shows an electric arc spraying system according to a fifth embodiment of the present invention.

FIG. 9 shows an electric arc spraying system according to a fifth embodiment of the present invention, illustrating an instance where the thermal spray is performed with the use of only one arc spraying unit. As shown in the figure, the pail packs 32a, 32b are on a wire feeder rotation mechanism 33. Target wires 31a, 31b in the pail packs are sent by push-side wire feeders 35a, 35b respectively. Two wire support cables 36a–36b are arranged in parallel to each other from the push-side wire feeders 35a, 35b to a cable support mechanism 110. The wire support cables 36a, 36b are then crossed with each other by the cable support mechanism 110. Thereafter, the wire support cables 36a, 36b are parallel to each other from the cable support mechanism 110 to a pull-side wire feeder 38 mounted on the spraying gun 37. The cable support mechanism 110 is positioned at or near the apex of the cable-extending curve.

Figure 10A:
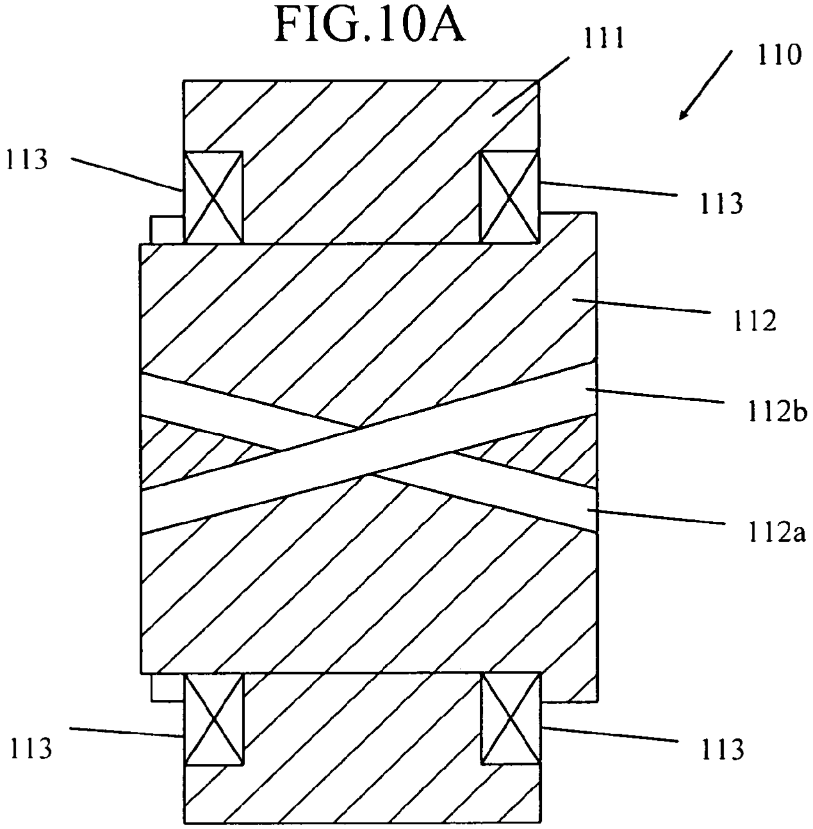
FIG. 10 shows a cable support mechanism for the fifth embodiment.
Figure 10B:
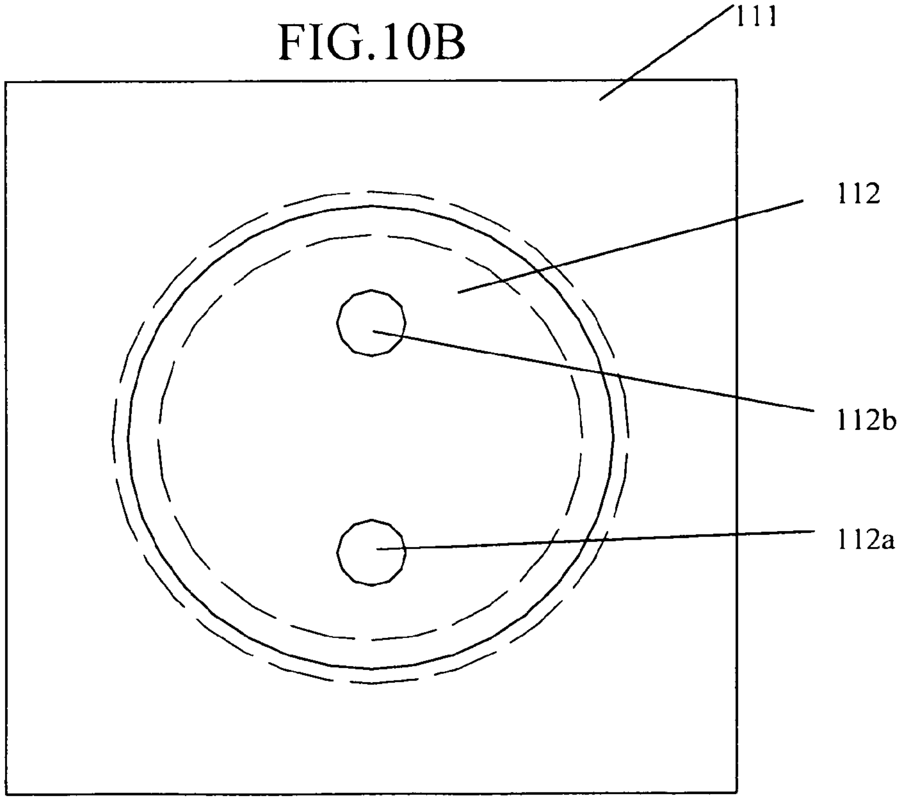

Referring to FIGS. 10A and 10B together with FIG. 9, the cable support mechanism 110 is described. FIG. 10A is a sectional front or plan view and FIG. 10B is a right side view of the support mechanism 110. As shown in these figures, the cable support mechanism 110 includes a support main body 111, and a rotation member 112 that is rotatably supported by the main body 111. The rotation member 112 is formed with two cable insertion holes 112a–112b crossing with each other. The main body 111 is held by a support post 114 (see FIG. 9). A bearing 113 is provided between the rotation member 112 and the support main body 111 to minimize the time-lag in rotation between the end portion and apex portion of the cables 36a–36b.

The spraying system of the fifth embodiment operates in the following manner. The push-side wire feeders 35a, 35b send the target wires 31a, 31b from the pail packs 32a, 32b. Since the wire support cables 36a, 36b are crossed with each other by the cable support mechanism 110, the target wires 31a, 31b guided by the wire support cables 36a, 36b are crossed with each other and sent to the pull-side wire feeder 38 mounted on the spraying gun 37.

As the spraying gun 37 rotates in the arrow-indicated direction as in FIG. 9 and the rotation mechanism 33 rotates in the opposite direction synchronously with the gun 37, the wire support cables 36a, 36b also rotate in the arrow-indicated direction in the figure. Then, the rotation member 112 in the cable support mechanism 110 also rotates in the arrow-indicated direction. In this process, the wire support cables 36a, 36b are not be contracted or stretched since there is no compressing or pulling force acting on the cables as described with reference to FIG. 8. Consequently, there is no change in the frictional resistance between the target wires 31a, 31b and the wire support cables 36a, 36b. Thus, it is possible to supply the target wires 31a, 31b stably, and to form a uniform thermal coating layer.

Figure 11:
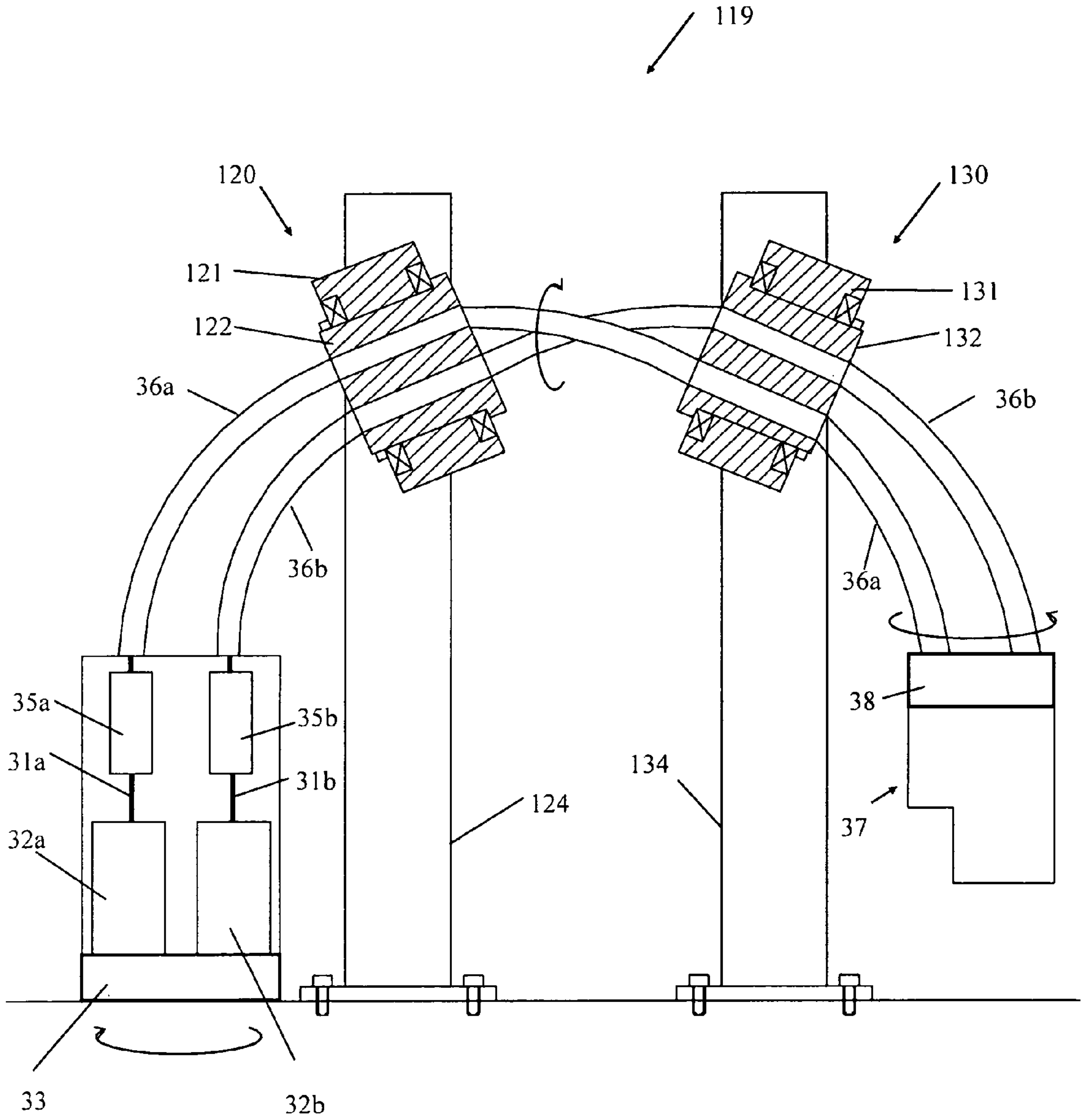
FIG. 11 shows an electric arc spraying system according to a sixth embodiment of the present invention.

FIG. 11 shows an electric arc spraying system according to a sixth embodiment of the present invention. In this embodiment again, the thermal spraying is performed with the use of only one arc spraying unit. As shown in the figure, a cable support mechanism 119 includes a first cable support 120 and a second cable support 130. In FIG. 11, the elements which are the same as or similar to those shown in FIG. 9 are indicated by the same reference characters, and their functions are not described below.

Figure 12A:
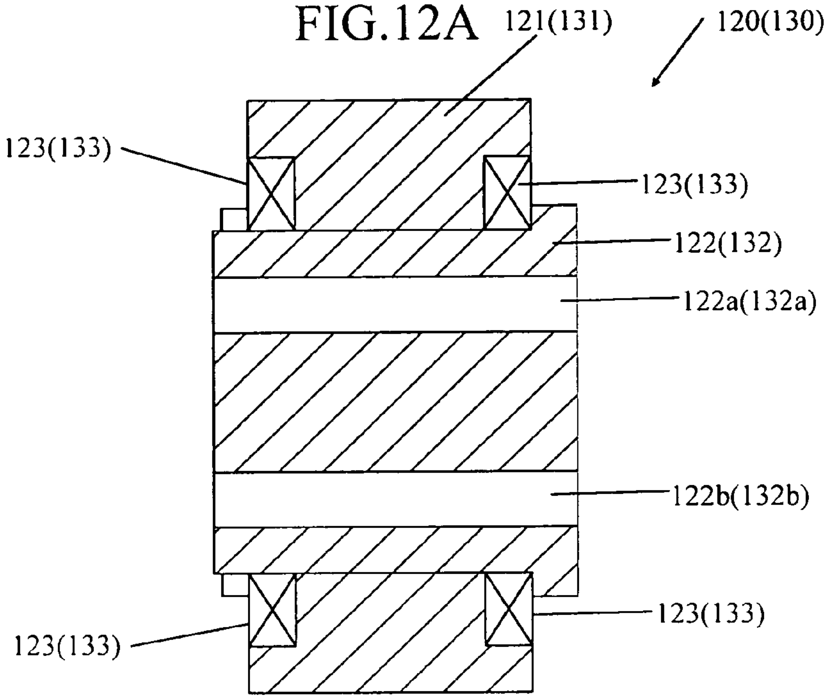
FIG. 12 shows first and second cable supports for the sixth embodiment.
Figure 12B:
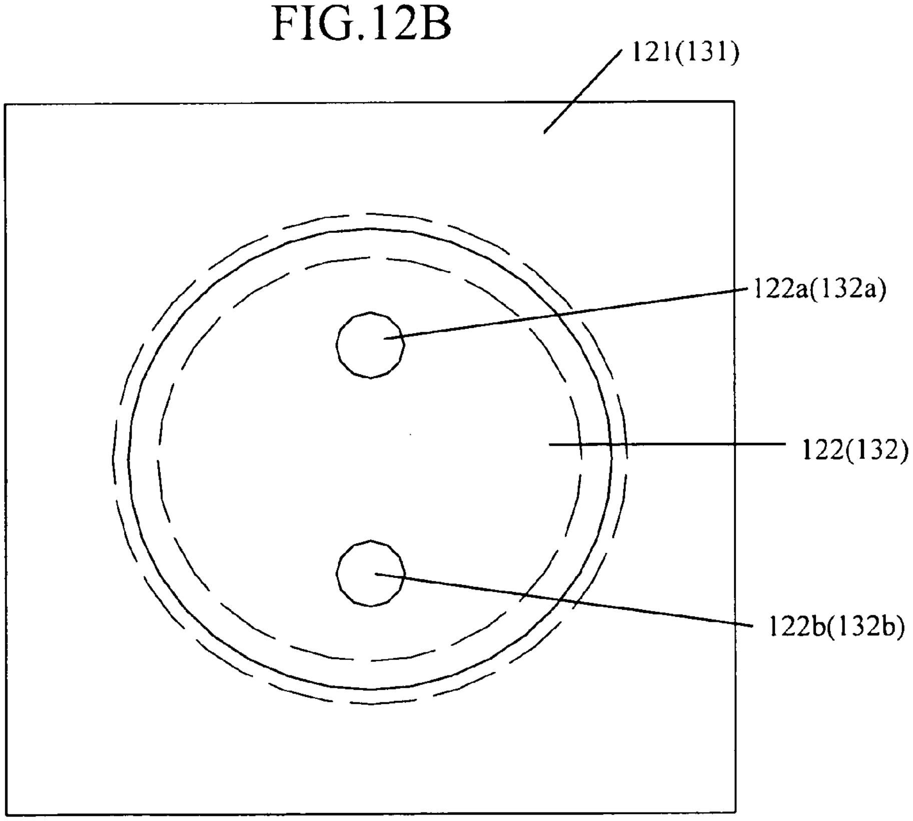

Referring to FIGS. 12A and 12B together with FIG. 11, the first cable support 120 and the second cable support 130 are described. FIG. 12A is a front view, and FIG. 12B is a side view of the first cable support 120 and the second cable support 130.

As shown in FIG. 11 or FIG. 12A, the first cable support 120 includes a first support main body 121 and a first rotation member 122 which is held rotatably by the first support main body 121. The rotation member 122 is formed with two parallel cable insertion holes 122a, 122b. The first support main body 121 is supported by a first support post 124 (FIG. 11). A bearing 123 is provided between the first rotation member 122 and the first support main body 121 to minimize the time-lag in rotation between the end portion and apex portion of the cables 36a–36b.

Likewise, the second cable support 130 includes a second support main body 131 and a second rotation member 132 which is held rotatably by the second support main body 131. The rotation member 132 is formed with two parallel cable insertion holes 132a, 132b. The second support main body 131 is supported by a second support post 134. A bearing 133 is provided between the second rotation member 132 and the second support main body 131 to minimize the time-lag in rotation between the end portion and apex portion of the cables 36a–36b.

With the above-described arrangement, two wire support cables 36a, 36b run in parallel to each other from the push-side wire feeders 35a, 35b to the first cable support 120, at which the wire support cables 36a, 36b go into the first cable support 120. Then, the wire support cables 36a, 36b cross with each other between the first cable support 120 and the second cable support 130, and then go into the second cable support 130. Thereafter, the wire support cables 36a, 36b run in parallel to each other from the second cable support 130 to the pull-side wire feeder 38 mounted on the spraying gun 37.

Preferably, the first cable support 120 and the second cable support 130 are attached at an angle to the respective support post 124, 134 as shown in FIG. 11, allowing the wire support cables 36*a*, 36*b* to move smoothly through the holes in the rotation members.

The operation of the sixth embodiment is substantially the same as that of the fifth embodiment. Further, due to the twin cable supports 120, 130, the target wires 31*a*, 31*b* are supplied more stably, which contributes to forming of a more uniform thermal coating layer.

In the fifth embodiment shown in FIG. 9 and the sixth embodiment shown in FIG. 11, the cable support mechanisms are supported by a support post. Alternatively, these cable support mechanisms may be suspended from the ceiling, or may be fixed to a wall.

The invention claimed is:

1. An electric arc spraying system comprising:

a spraying gun for thermally spraying an inner surface of an object by blasting compressed gas substantially perpendicularly to a supplying direction of target wires;

a spraying gun rotation mechanism for rotating the spraying gun;

wire supplying sources loaded with the target wires;

a wire feeder rotation mechanism for rotating the wire supplying sources synchronously with the spraying gun in rotation;

wire feeders provided on a side of the spraying gun or the wire supplying sources for feeding the target wires; and wire support cables for guiding the target wires from the wire supplying sources to the spraying gun.

2. The system according to claim 1, further comprising a cable support mechanism for supporting two wire support cables and causing the two wire support cables to cross with each other, wherein an exiting direction of the target wires from the wire supplying sources is opposite to an entering direction of the target wires into the spraying gun, wherein the two wire support cables are parallel to each other between the wire supplying sources and the cable support mechanism, the two wire support cables being inserted into the cable support mechanism in a mutually crossing manner, the two wire support cables being parallel to each other between the cable support mechanism and the spraying gun.

3. The system according to claim 2, wherein the cable support mechanism includes a support main body and a rotation member which is rotatably supported by the support main body, the rotation member being formed with two cable insertion holes crossing with each other.

4. The system according to claim 2, wherein the cable support mechanism comprises a first cable support and a second cable support, the first cable support including a first support main body and a first rotation member which is rotatably supported by the first support main body and formed with two cable insertion holes parallel to each other, the second cable support including a second support main body and a second rotation member which is rotatably supported by the second support main body and formed with two cable insertion holes parallel to each other, wherein the two wire support cables are crossed with each other between the first cable support and the second cable support.

* * * * *